United States Patent [19]

Cline

[11] Patent Number: 4,486,805

[45] Date of Patent: Dec. 4, 1984

[54] LIGHTNING ARRESTER WITH IMPROVED SPARK GAP STRUCTURE

[75] Inventor: Jay D. Cline, Ft. Lauderdale, Fla.

[73] Assignee: Dayton-Granger, Inc., Ft. Lauderdale, Fla.

[21] Appl. No.: 473,175

[22] Filed: Mar. 7, 1983

[51] Int. Cl.³ .............................................. H02H 9/06

[52] U.S. Cl. .................................... 361/133; 361/117; 361/134; 313/154; 313/231.11

[58] Field of Search ............... 361/133, 134, 136, 120, 361/117, 118, 119, 56, 91; 315/36, 59; 313/231.11, 154

[56] References Cited

U.S. PATENT DOCUMENTS

| | | | |
|---|---|---|---|
| 2,890,383 | 6/1959 | Olsen . | |
| 2,890,389 | 6/1959 | Carpenter et al. | 361/134 X |
| 2,896,116 | 7/1959 | Cunningham . | |
| 2,906,922 | 9/1959 | Huber | 361/134 X |
| 2,906,925 | 9/1959 | Yonkers et al. . | |
| 2,922,914 | 1/1960 | Carpenter et al. . | |
| 2,985,788 | 5/1961 | Opsahl et al. . | |
| 3,047,769 | 7/1962 | Hicks et al. . | |
| 3,076,114 | 1/1963 | Hicks . | |
| 3,154,718 | 10/1964 | Yonkers et al. | 361/134 X |
| 3,248,600 | 4/1966 | Sankey et al. . | |
| 3,271,619 | 9/1966 | Lafferty | 361/134 X |
| 3,280,376 | 10/1966 | Person | 361/133 |
| 3,320,462 | 5/1967 | Kawiecki | 361/134 X |
| 3,348,100 | 10/1967 | Kresge . | |
| 3,354,345 | 11/1967 | Stetson . | |
| 3,363,135 | 1/1968 | Parker . | |
| 3,366,822 | 1/1968 | Sakshaug | 361/134 X |
| 3,376,458 | 4/1968 | Liao | 361/120 X |
| 3,543,097 | 11/1970 | Smith, Jr. . | |
| 3,566,201 | 2/1971 | Sakshaug et al. . | |
| 3,626,237 | 12/1971 | Bolton et al. | 361/117 X |
| 4,177,493 | 12/1979 | Bliamptis | 361/133 X |

OTHER PUBLICATIONS

"Aircraft Antenna System Lightning Protection", by R. F. Huber, M. M. Newman and J. D. Robb, Reprinted from *IRE Transactions on Aeronautical and Navigational Electronics*, vol. ANE-2, No. 3, Sep., 1955.

"Airline Cooperative Program Researches with the Lightning & Transients Research Institute on Aircraft Lightning Protection", by D. S. Little of ARINC Research Corporation and M. M. Newman of Lightning & Transients Research Institute, AFAL-TR-68-290, Part II, pp. 111-122.

*Primary Examiner*—Patrick R. Salce
*Attorney, Agent, or Firm*—Biebel, French & Nauman

[57] ABSTRACT

An improved arc gap structure for a lightning arrester comprises first and second annular electrodes concentrically arranged relative to one another. The first electrode has a generally cylindrical inner surface which tapers to a smaller diameter toward one end. The second electrode has a generally cylindrical outer surface which is sized to be spaced apart from the inner surface of the first electrode when received therein. The electrodes are axially displaced relative to one another such that the spacing between the upper corner of the second electrode and the tapered portion of the first electrode define the ignition arc gap for the lightning arrester. The second electrode is preferably axially adjustable relative to the first electrode to select a desired arc over voltage for the lightning arrester. A magnet inserted within the second electrode is positioned to generate a field within the gap between the electrodes to move an arc axially away from the ignition arc gap and to circulate the arc around the cylindrical surfaces of the electrodes until it is extinguished.

10 Claims, 4 Drawing Figures

LIGHTNING ARRESTER WITH IMPROVED SPARK GAP STRUCTURE

BACKGROUND OF THE INVENTION

The present invention relates generally to lightning surge arresters and more particularly to an improved arc or spark gap structure for use in such arresters.

Lightning arresters are utilized to protect electrical equipment, for example, communications equipment on aircraft, from receiving damaging lightning strikes. Prior art lightning arresters include spark gap structures having variously formed electrodes which are spaced apart from one another such that high voltage and current lightning strikes arc across the spark gap and are thereby shorted to ground. Lightning strikes are thus intercepted by the lightning arrester prior to reaching the electrical equipment.

For proper operation of a lightning arrester, the arc over or break down voltage of the spark gap must remain substantially constant during the life of the arrester. A substantially constant arc over voltage permits the arrester to function properly for all voltages exceeding the rated arc over voltage, and prevents the arrester from shunting out or bypassing voltages below the rated arc over voltage. For example, as previously mentioned, aircraft communications equipment must be protected from lightning surges which would otherwise damage the equipment, yet it must also transmit and/or receive communications signals for proper operation. Received signals are of extremely low voltage levels; however, transmitted signals may reach several thousand volts and, hence, the gap must be large enough to prevent arc over of transmitted signals.

A problem encountered in many arc gap structures is that the high arc current often pits and scars the electrode surfaces and the resulting surface irregularities change the arc over voltage of the gap.

Various arc gap structures and techniques have been employed to reduce the damage which can otherwise be caused at the arc gap. For example, U.S. Pat. No. 2,906,925 discloses unequally spaced electrodes such that the arc is initiated across the minimum arc gap distance, and then moves toward the ends of the electrodes as the arc tends to lengthen. However, in this arrangement, the same areas of the electrodes serve as the initial arc over or ignition point with the result that after repeated arcs, the surfaces become pitted and scarred reducing the potential life of the lightning arrester.

Another arc gap arrangement is disclosed in U.S. Pat. No. 2,906,922, wherein two concentric electrodes form a spark gap which has a magnetic field imposed thereacross. The magnetic field causes arcs formed across the arc gap to move circularly around the concentric electrodes and thereby reduce the potential damage to the arc gap. Also, the point of arc over or arc ignition is randomly determined about the arc gap since the electrodes are equally spaced throughout the circular gap between the two electrodes. This arrangement, however, has no provision for lengthening the gap across which the arc extends to help extinguish arcs formed in the arrester and arcs are circulated over the same portion of the gap in which initial arc over or ignition occurs. Thus, while circulating arcs cause less damage than stationary arcs, any damage to the arc gap is within the ignition or initial arc over region of the gap.

It is thus apparent that the need exists for an improved arc gap structure for a lightning arrester which ensures a substantially constant arc over voltage during an extended useable lifetime.

SUMMARY OF THE INVENTION

Problems in the prior art are solved in accordance with the present invention by an improved arc gap structure wherein high current lightning arcs are initiated at random locations on ignition arc gap surfaces and immediately thereafter are moved away from those ignition arc gap surfaces, lengthened, and continuously moved across electrode surfaces defining a lengthened arc gap. The improved arc gap structure reduces the amount of pitting and surface distortion of both the narrow ignition arc gap and the lengthened arc gap in which residual arc follow on current flows and the arc is ultimately extinguished.

The improved arc gap structure of the present invention comprises first and second annular electrodes concentrically arranged relative to one another. The first electrode has a generally cylindrical inner surface which tapers to a smaller diameter toward one end. The second electrode has a generally cylindrical outer surface which is sized to be spaced apart from the inner surface of the first electrode when inserted thereinto. The second electrode is positioned generally concentrically with the cylindrical inner surface of the first electrode but axially displaced relative to the tapered portion of the first electrode. The amount of axial displacement between the second electrode and the tapered portion of the first electrode define a concentric narrow gap therebetween to define the arc over voltage of the lightning arrester. Magnetic means are associated with the electrodes and positioned to generate a field within the gap between the electrodes for moving an arc axially away from the tapered portion of the first electrode and circularly around the cylindrical surfaces of the electrodes to thereby lengthen and circulate the arc until it is extinguished.

The axial displacement between the tapered portion of the first electrode and the second electrode is preferably adjustable to permit selection of the arc over voltage for the lightning arrester. The magnetic means is preferably supported within the second electrode which, in the preferred embodiment, is moved to perform the selection of the arc over voltage of the lightning arrester. The initial arc surface or arc ignition surface of one of the electrodes is preferably slotted axially to effectively form a series of discrete arc conductors such that the magnetomotive force on an arc is increased due to the concentration of the arc current within a segment of the slotted electrode thus formed.

The improved arc gap structure is mounted within an insulated housing having a pair of electrical connectors disposed at opposite ends of the housing. A transmission unit including a capacitor extends between the connectors with the second or inner annular electrode supported on the transmission unit and electrically connected to one side of the capacitor. The first or outer annular electrode is supported by the housing and surrounds the inner annular electrode. Magnetic means supported within one of the electrodes develops a magnetic field between the electrodes to move an arc formed across the ignition arc gap region defined between the inwardly tapered portion or frustoconical section of the outer annular electrode and the inner electrode away from the frustoconical section and around the lengthened arc gap region formed between the cylindrical sidewalls of the electrodes. Accordingly, arcs formed at random locations around the ignition arc gap region within the lightning arrester are moved from the ignition arc gap region to a lengthened, follow on arc gap region and circulated around the electrodes within the lengthened, follow on arc gap region until the arcs are extinguished.

It is, therefore, an object of the present invention to provide an improved arc gap structure for a lightning arrester wherein a generally cylindrical outer electrode receives a generally cylindrical inner electrode with the outer electrode including an evenly inwardly tapering end section which defines an adjustable ignition arc gap with the inner cylindrical electrode, which ignition arc gap is adjusted by axial movement of the two electrodes relative to one another, wherein magnetic means are associated with the electrodes and positioned to move an arc axially away from the ignition arc gap toward a lengthened arc gap between the generally cylindrical portions of the electrodes and to simultaneously circulate the arc around the electrodes such that an arc is moved in a generally spiral path from a random arc ignition point to the lengthened arc gap where it is circulated until extinguished.

It is another object of the present invention to provide an improved arc gap structure wherein magnetomotive forces are applied to an arc to initially move the arc in a generally spiraling path from a random ignition point within an ignition arc gap region to a lengthened arc gap region where the arc is circulated until it is extinguished, the magnetomotive forces being increased by segmenting one of two concentric but axially offset annular electrodes within the lightning arrester.

Other objects and advantages of the invention will be apparent from the following description, the accompanying drawings, and the appended claims.

DETAILED DESCRIPTION OF THE INVENTION

Figure 1:
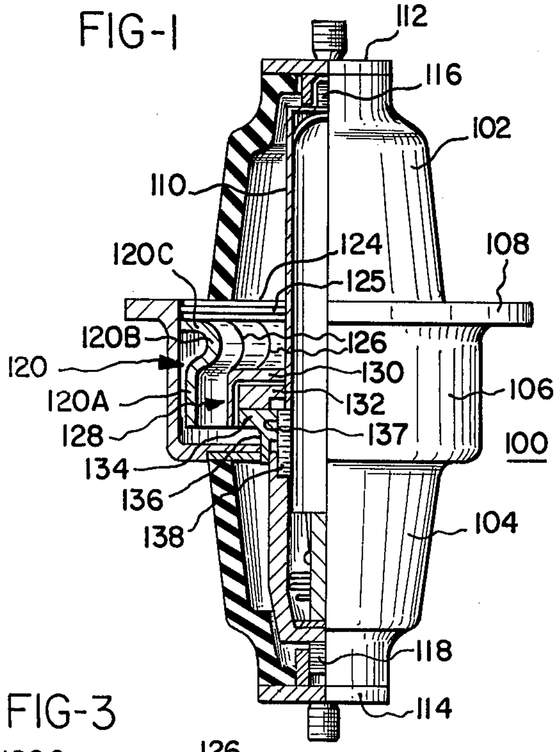
FIG. 1 is a partially sectioned side view of a lightning arrester including the improved spark gap structure of the present invention.
Figure 2:
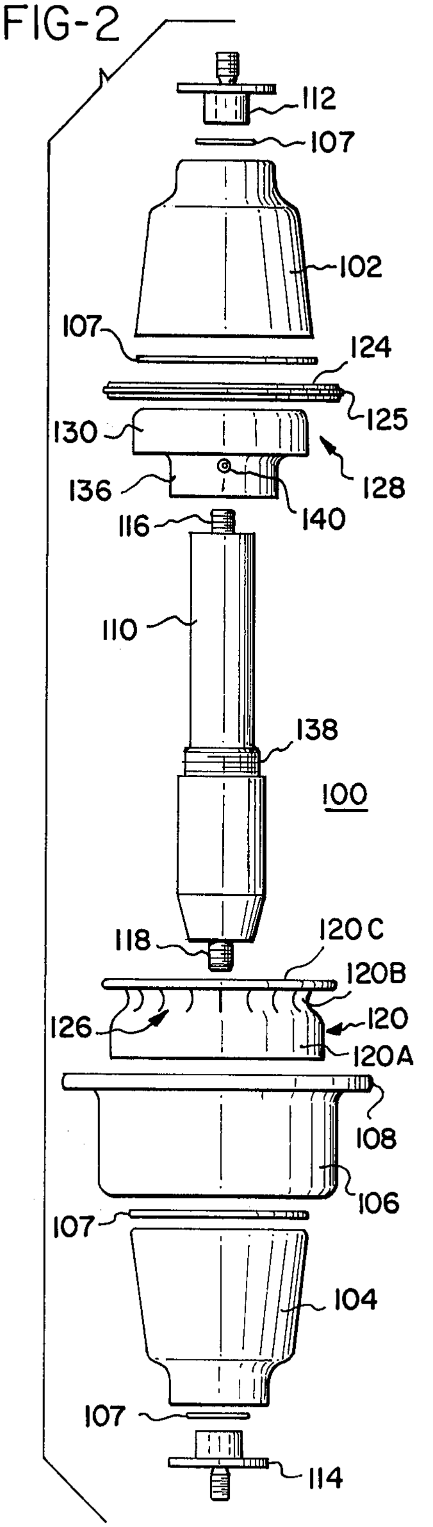
FIG. 2 is an exploded view showing the individual components making up the lightning arrester of FIG. 1.

The improved arc gap structure, in accordance with the present invention, is illustrated in an aircraft lightning arrester 100, shown partially sectioned in FIG. 1. It is noted that the arc gap structure, while being well suited to aircraft lightning arresters as illustrated herein, is applicable generally where lightning surges must be shunted to ground.

The lightning arrester 100 comprises first and second housing halves 102 and 104 which are constructed from glass or other electrically insulating material. A generally cylindrical electrically conducting collar 106 is inserted between the housing halves 102 and 104 and surrounds the arc gap structure in accordance with the present invention. The conductive collar 106 includes an upper flange 108 which is conveniently utilized to mount the lightning arrester 100 and provide an electrical connection to ground potential such as the air frame of an airplane so that lightning arcs can be diverted through the flange 108 of the collar 106 to ground.

A generally cylindrical transmission unit 110 comprises a coupling capacitor and a bleeder resistor connected in parallel. The construction of such transmission units is well known in the art. Electrical connectors 112 and 114 threadedly engage studs 116 and 118 formed at the ends of the cylindrical transmission unit 110 to secure the housing halves 102 and 104 into engagement with the collar 106 and associated gaskets 107 to thereby maintain the assembly of the lightning arrester 100.

A first electrode 120 of the improved arc gap structure in accordance with the present invention comprises a generally cylindrical unit including an arc raceway surface, an electrode ignition gap area and a mounting flange or ground return. A generally cylindrical member 120A extends upwardly into a reduced diameter inwardly extending circular collar 120B which forms the ignition gap area. The lower surface of the circular collar 120B forms an inwardly extending frustoconical extension of the member 120A and the upper surface expands to form the mounting flange 120C or ground return. The mounting flange 120C is sized to frictionally engage the upper internal surface of the conducting collar 106 and is thereby supported concentrically within the upper end of the collar 106. The first electrode 120 is held within the collar 106 by a retainer 124 which includes a sealing O-ring 125. The collar 120B which forms the ignition gap area includes slots 126 therethrough to define commutator sections to increase the magnetomotive force on arcs formed within the lightning arrester as will be described hereinafter.

A second electrode 128 comprises a generally toroidal member 130 which includes a cavity for receiving a magnet 132 and a base disk 134 which is secured within the member 130 and includes a downwardly extending flange or skirt 136. The disk 134 includes a threaded central aperture 137 for engaging threads 138 formed on the cylindrical transmission unit 110. The axial positioning of the second electrode 128 relative to the inwardly tapering lower portion of the collar 120B of the first electrode 120 is adjusted by rotating the second electrode 128. As the electrode 128 is rotated, the threads in the disc 134 move along the threads 138 on the cylindrical transmission unit 110 with the direction of axial movement of the electrode 128 depending upon the direction of rotation. Once a desired ignition spark gap or arc over voltage has been set between the toroidal member 130 and the lower portion of the collar 120B by rotating the second electrode 128, the electrode 128 is secured to the cylindrical transmission unit 110 by means of a set screw 140.

Operation of the improved spark gap structure in accordance with the present invention will now be described with reference to FIGS. 3 and 4. In the event of a lightning strike to an antenna 142, for example, radio equipment 144 could be damaged if the high energy of the lightning was passed to the radio equipment 144. Accordingly, an arc gap lightning arrester 146 is provided such that the lightning is shunted or shorted to ground through the arrester. In the schematic diagram of FIG. 4, a cylindrical transmission unit 110 is shown as a high voltage capacitor 148 and a high resistance shunt 150.

Figure 3:
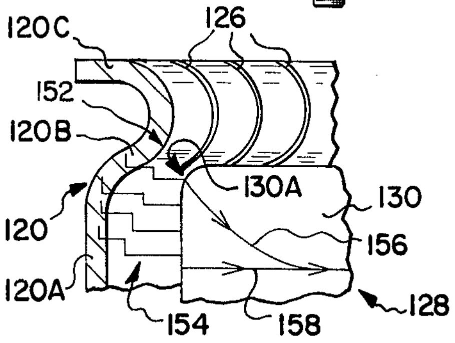
FIG. 3 is an enlarged, fragmentary view illustrating the action of the improved spark gap structure in accordance with the present invention.
Figure 4:
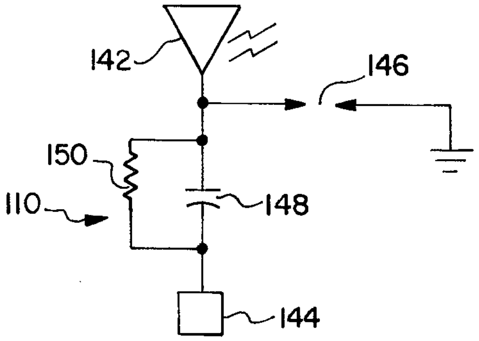
FIG. 4 is a schematic diagram of a circuit embodying the lightning arrester having a spark gap in accordance with the present invention.

Operation of the improved spark gap structure in accordance with the present invention can be more clearly seen with reference to FIG. 3. The arc gap defined between the electrodes 120 and 128 is narrowest at the point where the upper corner surface 130A of the toroidal member 130 of the electrode 128 approaches the lower surface of the collar 120B. By moving the electrode 128 along the threads 138, the precise arc gap for a desired breakdown or arc over voltage for the lightning arrester may be selected.

An arc develops or ignites at a random point along the narrowest portion 152 of the arc gap shown in FIG. 3. The arc would tend to lengthen and, hence, would tend to move downwardly toward the widest portion 154 of the arc gap. In the present invention, arc lengthening movement away from the point of arc ignition is reinforced by magnetomotive forces exerted on arc currents within the magnetic field generated by the magnet 132. Such magnetomotive forces are in accord with basic motor theory, i.e., when current is passed through conductors of a rotor in the presence of a magnetic field, the rotor is moved through the field. In this application, the conductors are the arcs themselves.

The magnet 132 is positioned within the toroidal member 130 at a location such that the maximum strength of the magnetic field formed in the arc gap between the electrodes 120 and 128 is toward the widest portion 154 of the arc gap. The force of the magnetic field on the arc also moves the arc around the circular gap formed between the two electrodes 120 and 128. Accordingly, an arc ignited at a random point along the circular ignition arc gap region or the narrowest portion 152 of the arc gap is moved toward the circular lengthened arc gap region or the widest portion 154 of the arc gap between the two electrodes in a spiraling motion (see arrow 156) and then circulated (see arrow 158) within the widest portion 154 or arc raceway of the arc gap until the arc is extinguished.

Since the narrowmost portion 152 of the arc gap is generally uniform between the electrodes 120 and 128, the arc may be initiated at any point randomly about the ignition arc gap region as previously suggested. Further, since the arc is immediately moved circularly around the electrodes and away from the point of ignition toward the widest portion 154 of the arc gap, the majority of the arc energy and follow on current is dissipated within the lengthened arc gap region. Accordingly, the ignition arc gap region remains relatively undamaged so that repeated lightning strikes break down the arc gap at a relatively consistent voltage for a large number of strikes and, hence, a long lived lightning arrester is provided.

To increase the magnetomotive forces created by the magnetic field of the magnet 130 on arcs formed between the electrodes 120 and 128, slots 126 are formed in one of the electrodes 120 or 128, preferably the electrode 120, to produce in effect a series of discrete conductors. When an arc ignites, the current is concentrated into one of the segments defined between two of the slots and thereby increases the magnetomotive force on the arc as it moves across the segments.

While the form of apparatus herein described constitutes a preferred embodiment of this invention, it is to be understood that the invention is not limited to this precise form of apparatus and that changes may be made therein without departing from the scope of the invention which is defined in the appended claims.

What is claimed is:

1. An arc gap arrangement for a lightning arrester comprising: first and second annular electrodes concentrically arranged relative to one another, the first of said electrodes having a generally cylindrical inner surface which tapers to a smaller diameter toward one end thereof and the second of said electrodes having a generally cylindrical outer surface sized to be spaced apart from the inner surface of said first electrode when received therein, said first and second electrodes being displaced axially relative to one another with the amount of axial displacement defining the gap between the second electrode and the tapered portion of said first electrode to thereby define the arc over voltage of said lightning arrester; and magnetic means asociated with said electrodes and positioned for moving an arc circularly around said cylindrical surfaces from the point of arc ignition and axially away from the tapered portion of said first electrode to thereby lengthen and circulate the arc until it is extinguished.

2. The arc gap arrangement of claim 1 wherein said magnetic means is formed within said second electrode.

3. The arc gap arrangement of claim 1 wherein one of said electrodes is axially slotted to effectively form a series of discrete arc conductors whereby the magnetomotive force on an arc is increased.

4. The arc gap arrangement of claim 1 wherein the axial displacement between said first and second electrodes is adjustable to permit the selection of the arc over voltage of said lightning arrester.

5. An arc gap arrangement for a lightning arrester comprising an outer electrode having a generally cylindrical inner surface with one end having an inwardly tapering frustoconical section; an inner electrode having a generally cylindrical outer surface inserted into said outer electrode and being axially aligned therewith, one end of said inner electrode being axially displaced from the frustoconical section of said outer electrode by a selected distance which defines the ignition arc gap and, hence, the arc over voltage of said lightning arrester; and magnetic means supported by said inner electrode for producing a magnetic field between said electrodes to cause an arc developed within said arc gap to move around said electrodes and away from said frustoconical section in a generally spiraling initial path whereby said arc is lengthened and circulated until extinguished without appreciable deterioration of said ignition arc gap.

6. The arc gap arrangement of claim 5 wherein a plurality of slots are formed axially into said outer electrode to effectively form a series of discrete arc conductors whereby the magnetomotive force on an arc is increased.

7. The arc gap arrangement of claim 6 wherein said inner electrode can be moved axially relative to said outer electrode to select the arc over voltage of said lightning arrester.

8. A lightning arrester of the combined arc gap condenser type for use on aircraft to protect communications equipment from lightning strikes to an aircraft antenna comprising:

an insulated housing;

a pair of electrical connectors disposed at opposite ends of said housing;

a transmission unit including a capacitor extending between said conductors;

an inner annular electrode supported on said transmission unit and electrically connected to one side of said capacitor;

an outer annular electrode supported within said housing and surrounding said inner annular electrode, said outer annular electrode including an inwardly tapering frustoconical section axially spaced apart from said inner electrode to define a selected ignition arc gap therebetween; and magnetic means supported within one of said electrodes for developing a magnetic field between said electrodes to move an arc formed across said ignition arc gap away from said frustoconical section and around said electrodes whereby arcs formed within said lightning arrester are lengthened, moved away from said ignition arc gap and circulated around said electrodes until extinguished.

9. The ligntning arrester of claim 8 wherein said magnetic means is supported within said inner electrode.

10. The lightning arrester of claim 9 wherein said outer annular electrode includes a plurality of axially extending slots to effectively form a series of discrete arc conductors whereby the magnetomotive force on an arc is increased.

* * * * *